(12) United States Patent
Kaufmann et al.

(10) Patent No.: US 9,233,331 B2
(45) Date of Patent: Jan. 12, 2016

(54) AIR FILTER ELEMENT

(71) Applicant: MANN+HUMMEL GMBH, Ludwigsburg (DE)

(72) Inventors: Michael Kaufmann, Meckenheim (DE); Klaus-Dieter Ruhland, Meckenheim (DE)

(73) Assignee: MANN + HUMMEL GMBH, Ludwigsburg (DE)

( * ) Notice: Subject to any disclaimer, the term of this patent is extended or adjusted under 35 U.S.C. 154(b) by 34 days.

(21) Appl. No.: 14/177,869

(22) Filed: Feb. 11, 2014

(65) Prior Publication Data
US 2014/0223868 A1 Aug. 14, 2014

Related U.S. Application Data

(60) Provisional application No. 61/815,214, filed on Apr. 23, 2013.

(30) Foreign Application Priority Data

| Feb. 12, 2013 | (DE) | 10 2013 002 274 |
| Feb. 12, 2013 | (DE) | 10 2013 002 275 |
| Feb. 12, 2013 | (DE) | 10 2013 002 276 |
| Feb. 12, 2013 | (DE) | 10 2013 002 277 |
| Feb. 12, 2013 | (DE) | 10 2013 002 278 |

(51) Int. Cl.
*B01D 46/00* (2006.01)
*B01D 50/00* (2006.01)
*F02M 35/02* (2006.01)
*F02M 35/022* (2006.01)
*F02M 35/024* (2006.01)
*F02M 35/08* (2006.01)
*B01D 46/24* (2006.01)

(52) U.S. Cl.
CPC ........ *B01D 46/0004* (2013.01); *B01D 46/0005* (2013.01); *B01D 46/008* (2013.01); *B01D 46/0041* (2013.01); *B01D 46/2414* (2013.01); *B01D 50/002* (2013.01); *F02M 35/0205* (2013.01); *F02M 35/0214* (2013.01); *F02M 35/0216* (2013.01); *F02M 35/0223* (2013.01); *F02M 35/0245* (2013.01); *F02M 35/02416* (2013.01); *F02M 35/02425* (2013.01); *F02M 35/02483* (2013.01); *F02M 35/08* (2013.01); *B01D 2265/021* (2013.01); *B01D 2265/06* (2013.01)

(58) Field of Classification Search
CPC .......... B01D 46/0004; B01D 46/0005; B01D 46/0024; B01D 46/008; B01D 2265/02; B01D 2265/024; B01D 2265/029; F02M 35/02416; F02M 35/02483
See application file for complete search history.

(56) References Cited

U.S. PATENT DOCUMENTS

| 4,135,899 A | 1/1979 | Gauer |
| 4,278,455 A | 7/1981 | Nardi |

(Continued)

FOREIGN PATENT DOCUMENTS

| DE | 7005799 U | 7/1970 |
| DE | 2947655 | 6/1980 |
| WO | 2008030835 A2 | 3/2008 |

*Primary Examiner* — Robert Clemente
(74) *Attorney, Agent, or Firm* — James Hasselbeck

(57) ABSTRACT

A filter system has a housing and at least one detachable cover detachably connected to the housing to close off the housing. At least one exchangeable element is arranged within the housing and provided with a follower contour. The cover is provided with a follower tool which matches the follower contour of the at least one exchangeable element. The follower tool is disposed on the exterior side of the cover. The follower tool is a follower contour provided on the cover.

13 Claims, 6 Drawing Sheets

(56) References Cited

U.S. PATENT DOCUMENTS

| | | |
|---|---|---|
| 5,753,117 A | 5/1998 | Jiang |
| 7,524,349 B2 * | 4/2009 | Schrage et al. .................. 55/502 |
| 7,988,757 B2 | 8/2011 | Scott et al. |
| 8,292,984 B2 | 10/2012 | Baseotto et al. |
| 2004/0134171 A1 * | 7/2004 | Scott et al. ...................... 55/482 |
| 2011/0247582 A1 | 10/2011 | Blossey et al. |
| 2012/0210683 A1 | 8/2012 | Gillenberg et al. |

* cited by examiner

AIR FILTER ELEMENT

CROSS-REFERENCE TO RELATED APPLICATIONS

This application claims the benefit of U.S. Provisional Application No. 61/815,214 filed: Apr. 23, 2013. This application claims foreign priority under 35 USC 119(b) to prior filed German patent applications 10 2013 002 274.6 filed Feb. 12, 2013; 10 2013 002 275.4 filed Feb. 12, 2013; 10 2013 002 277.0 filed Feb. 12, 2013; 10 2013 002 278.9 filed Feb. 12, 2013; and 10 2013 002 276.2 filed Feb. 12, 2013, the entire contents of the aforesaid U.S. Provisional Application and the aforesaid German patent applications being incorporated herein by reference.

BACKGROUND OF THE INVENTION

The invention concerns a filter system, in particular for use as an air filter in an internal combustion engine, as well as a filter element for installation in such a filter system.

WO 2009/047196 A1 discloses a filter system for internal combustion engines in which a secondary element is provided which is arranged in an inner space of the filter element of the filter system. The secondary element has the task of keeping closed the outlet of the filter system when exchanging the filter element so that no dirt can penetrate into this area while the filter element is cleaned or replaced. In operation of the filter system the purified air flows through the secondary element which comprises a nonwoven layer on a support structure. The secondary element is connected by means of a screw thread to the outlet socket of the outlet and, at the same time, is sealed by an O-ring in this area.

In principle, it is provided to exchange the filter elements of air filters after a certain operating time. Depending on the amount of dust that is collected, the service life of a filter element can be a few days (construction machinery) up to several months. In this context, the secondary element, arranged on the clean air side, remains usually within the filter system. However, when the secondary element is also strongly loaded with dirt, it must also be exchanged because otherwise the air throughput would be reduced too much. In this context, the reliable sealing action of filter element and secondary element in a housing ensuring safe operation is particularly important in order to protect the intake manifold of an internal combustion engine arranged downstream of the filter system from penetration of dirt.

The object of the invention is to provide a filter system in which a service-friendly attachment and detachment of a secondary element from its fastening means in the housing is enabled.

A further object of the invention is to provide a filter element and a secondary element for installation in such a filter system.

SUMMARY OF THE INVENTION

In accordance with the present invention, the aforementioned objects are solved according to one aspect of the invention by a filter system that has a housing with at least one detachable cover that closes off the housing as well as at least one exchangeable element with a follower contour that is arranged within the housing, wherein the cover is provided with a follower tool which corresponds with or matches the follower contour of the exchangeable element.

The service-related exchange of screw-on elements of a filter system such as filter elements and secondary elements is done usually by detaching and screwing on by hand. Particularly in case of large elements it becomes however more and more difficult to apply the required torque. Accordingly, it has become customary to employ separate tools in order to detach the elements and to screw them on again because greater torque can be applied by a greater lever action. This tool is now integrated into the cover of the system filter system so that it is available at any time in a service situation on site and cannot be lost. For example, the cover can have a follower contour that is provided also as a corresponding or matched negative shape on the exchangeable element so that it is sufficient to detach the cover from the filter housing, to turn it over, for example, in order to place the follower tool of the cover onto the element to be detached, and to unscrew the element by a rotational movement of the cover. In this case, the cover represents the tool or serves for handling the tool when the tool is used.

Advantageously, the sealing action for the filter element and secondary element in the housing can be designed to be temperature-resistant and vibration-resistant. Even in facilities or devices that are exposed to strong vibrations or impacts, the sealing action for the filter element and secondary element can be ensured because the secondary element can be secured particularly safely and fast to the housing. In order to prevent an accidental detachment in operation, it is possible in case of screw connections to apply a satisfactory torque so that also an appropriate release torque must be applied for an exchange. Even when higher torque is required, the attachment and detachment of the secondary element by means of its screw connection can be realized without additional tools that have to be carried along.

The follower contour that is complementarily provided on the secondary element and on the cover can be, for example, a polygon, a knurled structure, a rectangle and the like. When the follower contour is formed at the center of the cover, a relatively large diameter of the cover can provide an advantageous lever action.

The cover can cover the housing at the end face, for example, and can cover the opening through which the filter element is installed and removed. Conceivable are however also other housing parts which are detachably designed and are suitable for temporary detachment.

In one embodiment, the follower tool can be designed as a recess in the cover when, for example, the follower contour in the element is designed as a corresponding projection. Accordingly, both parts are matched to each other and the element can be detached by turning the cover.

In another embodiment, the configuration can be reversed so that the follower tool is designed as a projection on the cover when, for example, the follower contour in the element is designed as a matching recess. This also provides that both parts fit or match each other so that the tool functionality is fulfilled.

Preferably, the follower contour is arranged on the exterior side of the cover, in particular centrally on the exterior side of the cover. This has, for example, also the advantage that the follower contour is not located within the interior of the housing and does not occupy therein flow space or construction space.

In a beneficial embodiment, a filter system can comprise a housing with a longitudinal axis, a cover that closes off the housing at an end face, an inlet communicating with the interior of the housing and disposed at the housing for supplying a medium to be filtered, in particular air, and an outlet communicating with the interior of the housing and disposed at the housing for discharging the filtered medium, a filter element arranged within the housing, an exchangeable secondary element arranged in the inner space of the filter element and provided with a follower contour, wherein the cover has a follower tool complementary to the follower contour of the secondary element. The housing can be, for example, comprised of a housing wall and two opposed end faces. One of the end faces can be fixedly connected to the housing wall and the other end face can be embodied by the removable cover. The filter element as well as the secondary element arranged within the inner space of the filter element can be expediently concentrically arranged relative to the longitudinal axis of the housing. On the housing, concentric to the longitudinal axis, an outlet for discharging the filtered medium can be disposed. The filter element and the secondary element are usually exchangeably arranged in the housing of the filter system and are accessible after opening of the housing, for example, via the screw-on cover. With such an arrangement, the cover can be detached from the housing and can be used as a tool for detaching and tightening the secondary element by screwing; the cover represents at the same time a tool that is available at any time on site in a service situation and cannot be lost.

Advantageously, the secondary element can be connected by a screw connection with the housing so that a rotation of the cover engaging the secondary element is sufficient in order to release the secondary element.

Alternatively, the secondary element can also be connected by a rotary locking closure (bayonet coupling) with the housing. In this way, by engaging with the cover the secondary element and rotating the cover, the secondary element can be released from its locked position.

Expediently, the secondary element connected with the housing can remain in the housing when the filter element is exchanged. In this way, it is ensured that the air guiding manifold that adjoins the outlet of the filter housing is protected from soiling during the exchange process.

Advantageously, in the area of the inlet of the filter system a cyclone separator can be provided and a dirt outlet can be provided on the housing or on the cover. This cyclone separator is comprised of a guiding geometry that causes the medium to be filtered to rotate. Due to this rotation, the dirt in the area of the housing wall is concentrated and is then discharged at a suitable location by means of a dirt outlet. Due to the preseparation of most of the dirt from the air to be filtered, the service life of the actual filter element can be extended decisively.

In a further advantageous embodiment, an inlet and/or dirt outlet arranged at the cover can be designed as a grip lever. In this way, it is possible by lever action to apply a greater torque onto the elements to be released upon rotation of the cover; this may be of great importance in particular for very large filter systems or greatly soiled filter systems where the screw connections may possibly be stuck ("frozen").

Expediently, the filter system can be used as an air filter, in particular an air filter of an internal combustion engine. Safe operation of internal combustion engines is also based on a reliable and favorable filtration of the intake air for combustion. The described filter element provides an economic possibility for this purpose.

Advantageous is also the use of the filter system as a particle filter, in particular as an oil filter or fuel filter of an internal combustion engine. In this context, reliable mounting and economical replacement of the described filter element are of decisive importance.

The invention concerns as a further aspect a filter element for installation in a filter system as described above, wherein the filter element is exchangeably arranged in the housing of the filter system. Advantageously, in a service situation for exchange of the filter element, a tool integrated into the cover of the housing of the filter system can be used for releasing and tightening the filter element. In this way, the tool is always available on site in a service situation and cannot be lost.

Furthermore, the invention concerns a secondary element for installation in a filter system as described above, wherein the secondary element is exchangeably arranged in the housing of the filter system. Advantageously, when exchanging the secondary element in a service situation, a tool which is integrated into the cover of the housing of the filter system can be utilized for releasing and tightening the secondary element. In this way, the tool is always on site in a service situation and cannot be lost.

BRIEF DESCRIPTION OF THE DRAWING

Further embodiments and advantages of the invention can be taken from the claims, the description, and the drawing. Advantages are disclosed in the following description of the invention wherein embodiments of the invention are illustrated in the drawings. The drawings, the description, and the claims contain numerous features in combination. A person of skill in the art will also expediently consider these features individually and will combine them to other meaningful combinations.

In the Figures, same or functionally the same components are identified with same reference characters. The Figures show only examples and are not to be understood as limiting the invention.

DESCRIPTION OF THE PREFERRED EMBODIMENTS

Figure 1:
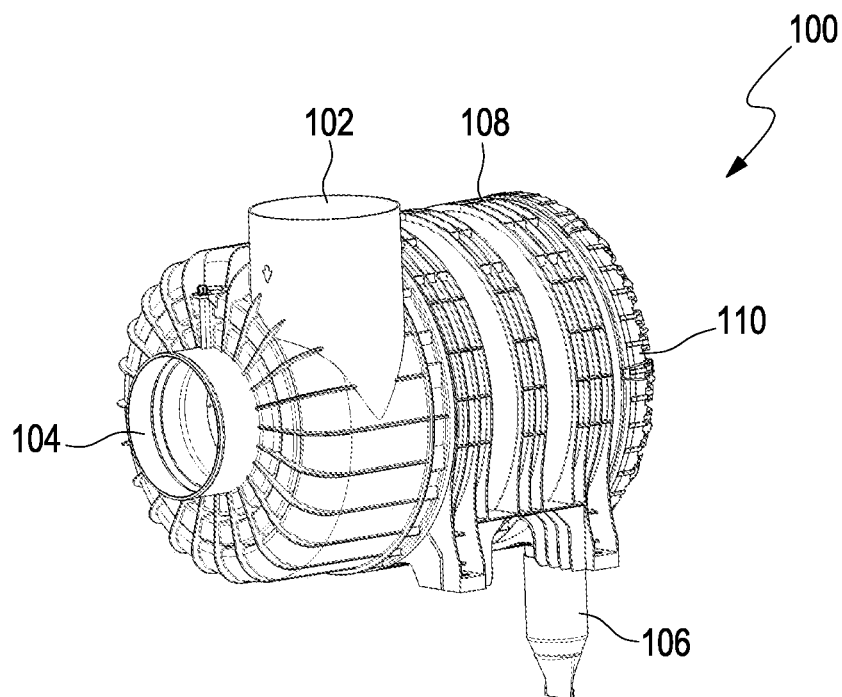
FIG. 1 shows in a perspective view a filter system according to one embodiment of the invention with tangential inlet, central outlet, and dirt outlet at the bottom.

FIG. 1 shows in a perspective illustration a filter system 100 according to one embodiment of the invention with tangential inlet 102, central outlet 104, and dirt outlet 106 at the bottom. Illustrated is a round filter configuration which is comprised of a housing 108 that is closed off by cover 110. In case of an air filter system, dust-laden air flows into the inlet 102 that is arranged tangentially to the air filter element installed in the interior of the housing so that the air in the interior of the housing 108 is caused to rotate due to an incoming flow protector provided at the filter element. Filter element and incoming flow protector are not illustrated in the drawing. Due to the cyclone effect that is caused by the rotational movement of the air, centrifugal forces act on the dirt particles of the inflowing air so that the dirt particles are partially separated at the housing wall and can be discharged through the dirt outlet 106 from the filter system 100. In this way, the filter element is loaded less with dirt. The purified air can be discharged via the central outlet 104 from the housing 108.

Figure 2:
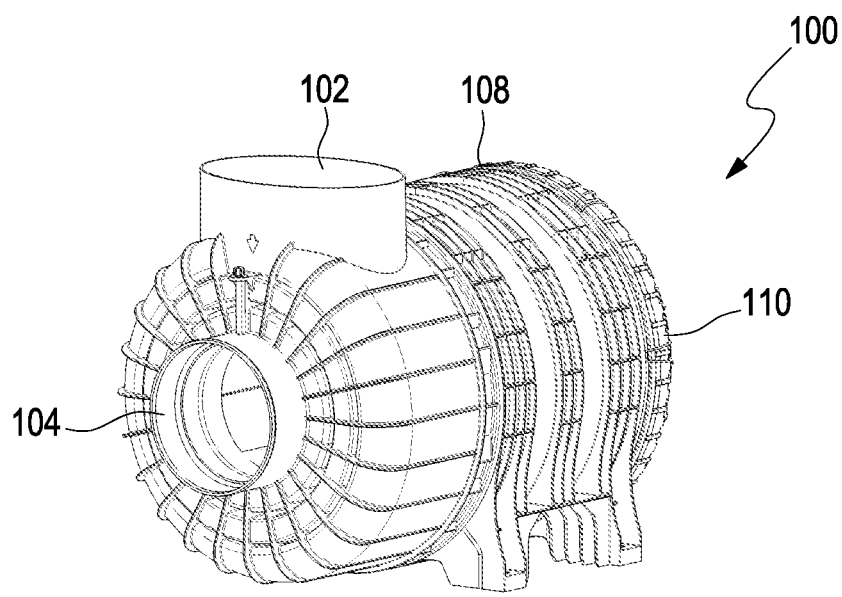
FIG. 2 shows in a perspective view a filter system according to another embodiment of the invention with radial inlet and central outlet.

FIG. 2 shows a perspective view of a filter system 100 of an embodiment with radial inlet 102 and central outlet 104. Illustrated is also a round filter configuration that is comprised of a housing 108 that is closed off by cover 110. The inlet through which dust-laden air flows into the housing is in this case arranged centrally above the filter element arranged in the interior. The outlet 104 by means of which the purified air can flow out is also centrally arranged, as shown also in FIG. 1.

Figure 3:
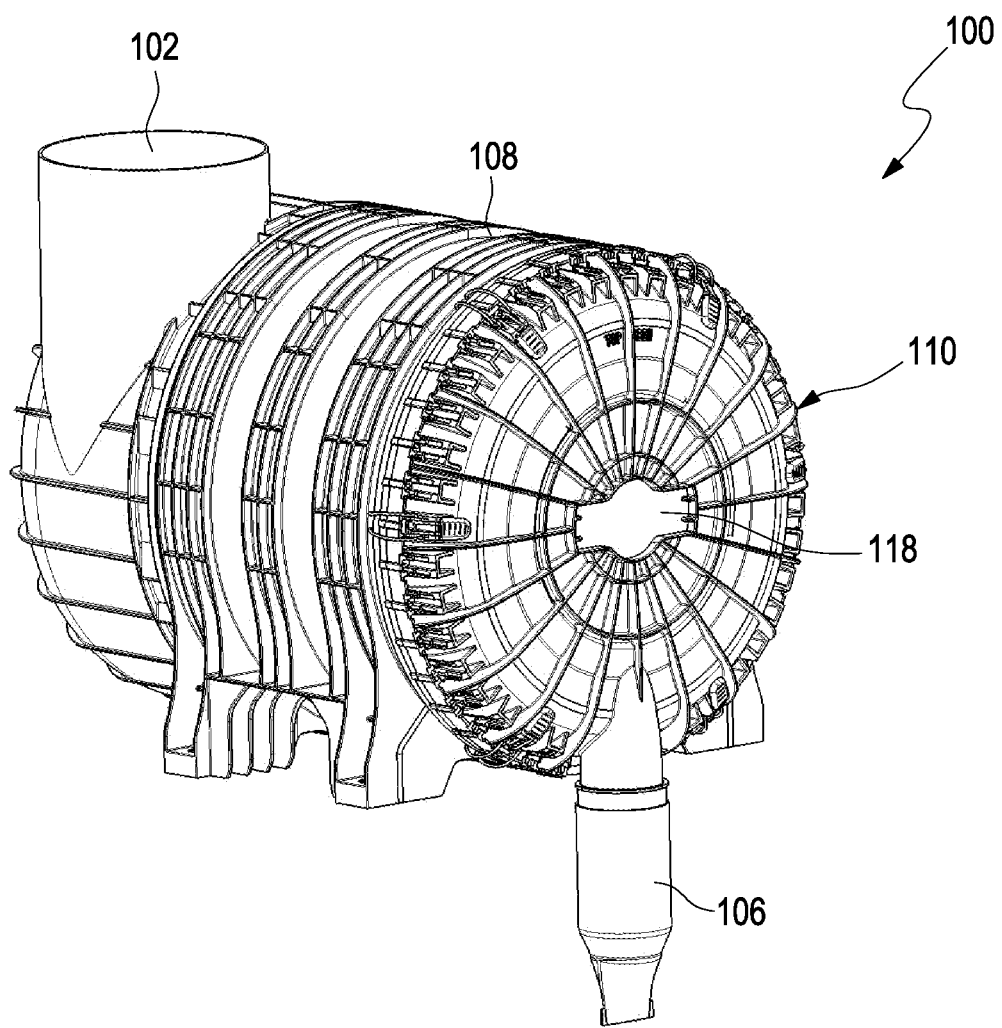
FIG. 3 shows in a perspective view the filter system according to FIG. 1, looking onto the cover with the follower tool being visible.

FIG. 3 shows a perspective view of a filter system 100 according to FIG. 1 illustrated in a view onto the cover with visible follower tool contour. It can be seen that in the cover 110 a follower contour 118 in the form of a recess is provided which, after removal of the cover 110 from the housing 108, can be used as a follower tool for releasing a secondary element of the filter system.

Figure 4:
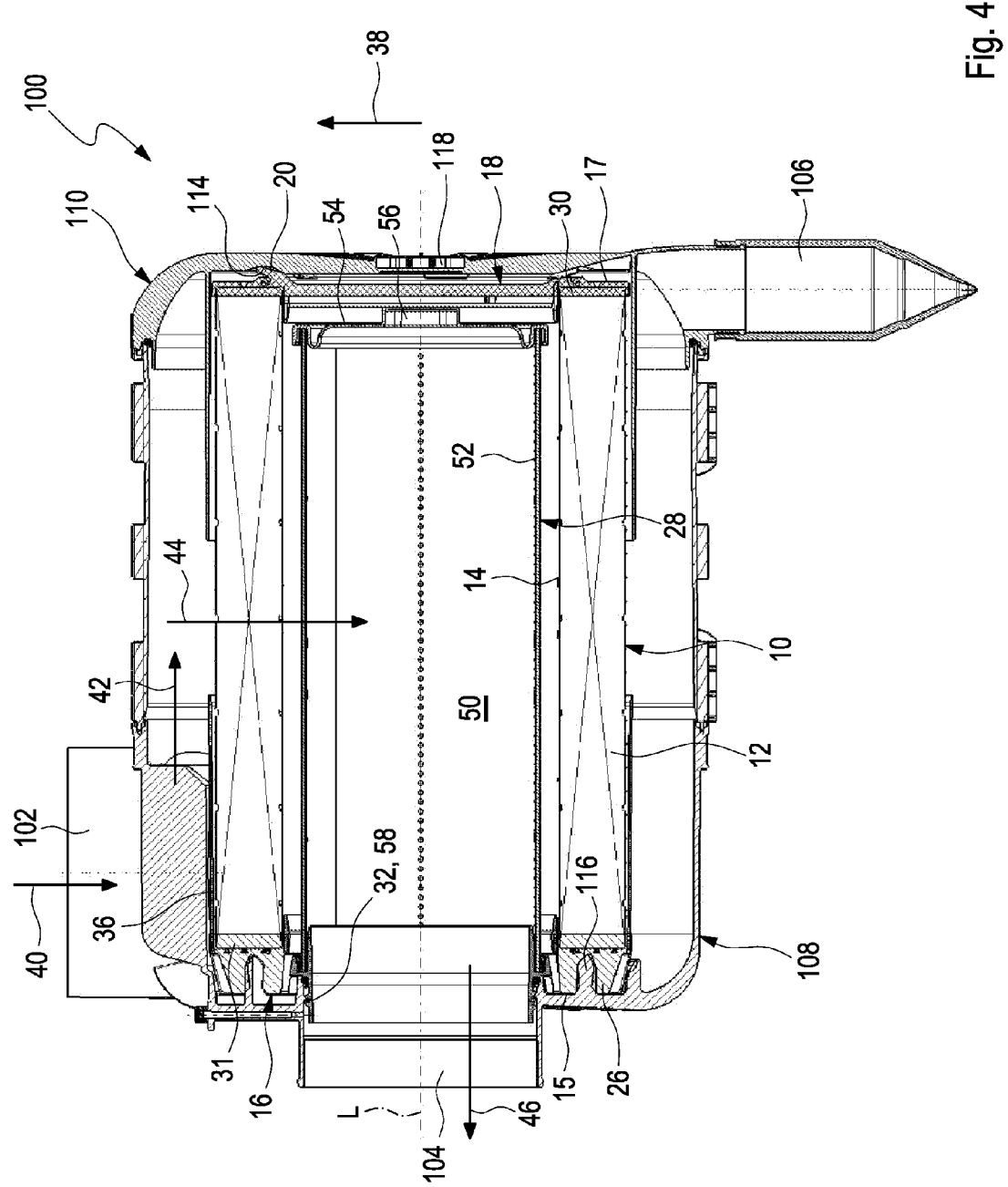
FIG. 4 is a longitudinal section view of the filter system according to FIG. 1.

In FIG. 4, a cross-section of the filter system 100 according to the embodiment with tangential inlet 102, central outlet 104, and dirt outlet 106 at the bottom is illustrated. The housing 108 of the filter system 100 is closed off by cover 110. A filter element 10 that is comprised of concentrically arranged support tube 14 and filter medium 12 is closed off at two oppositely positioned end faces with a first terminal disk 16 and a second terminal disk 18. The second terminal disk 18 has support knobs 20 which are arranged in a circular shape and extend axially in outward direction; upon insertion into the housing 108, they contact an inner cover contour 114 of the cover 110 in axial direction, engage in outward direction the contour 114, and in this way are supported on the housing 108 axially and radially. On the oppositely positioned end face of the filter element 10, a radial seal 26 is provided on the first terminal disk 16. By means of the seal 26 the filter element 10 is supported radially on the housing 108; the seal 26 seals off the unfiltered air chamber relative to the filtered air chamber. The filter element 10 is thus axially clamped as well as radially clamped twice relative to the housing 108.

Dust laden air can flow in through the inlet 102 which in this embodiment is illustrated as a tangential inlet that enables the cyclone operation by the effected rotational movement of the air. Dust particles can be partially preseparated by the rotational movement and deposited on the housing wall; they can be discharged from the filter system 100 through the dirt outlet 106 by the force of gravity when the filter housing 108 is installed with the dirt outlet 106 pointing in downward direction.

After partial separation of the dust particles in operation, the air flows through the filter medium 12 into the inner space of the filter element. Dust particles are retained within the filter medium starting at a certain size that depends on the filter medium. Depending on the dust load, the filter element must therefore be exchanged after a certain operating time. At the outlet end of the filter element 10, between support tube 14 and outlet 104, a secondary element 28 is provided that is comprised of a relatively permeable filter medium and, when the filter element 10 is exchanged, remains in the housing 108 as a protection for the downstream air guiding manifold of the internal combustion engine against penetration of dust particles and other objects. The secondary element 28 has at the closed end of the body 52 an end face 54 where a follower contour 56 is provided as a projection and can be used for release of the screw connection 32 at the housing 108. In the cover 110 of the housing 108 a follower contour 118 is illustrated as a recess. This follower contour 118 can be used as a follower tool after detaching the cover 110 from the housing 108 and after turning over the cover 110 and placing it on the follower contour 56 of the secondary element 28 so as to provide a follower tool. In this way, it is possible to apply a greater torque for release of the screw connection 32. The use as a follower tool is also possible in case that for the connection of the secondary element 28 to the housing 108 a rotary locking connection 58 (bayonet coupling) is used.

Alternatively, the follower contour 56 can also be designed in the secondary element 28 as a recess at the end face 54 when the follower contour 118 of the cover 110 is designed as a projection.

Figure 5:
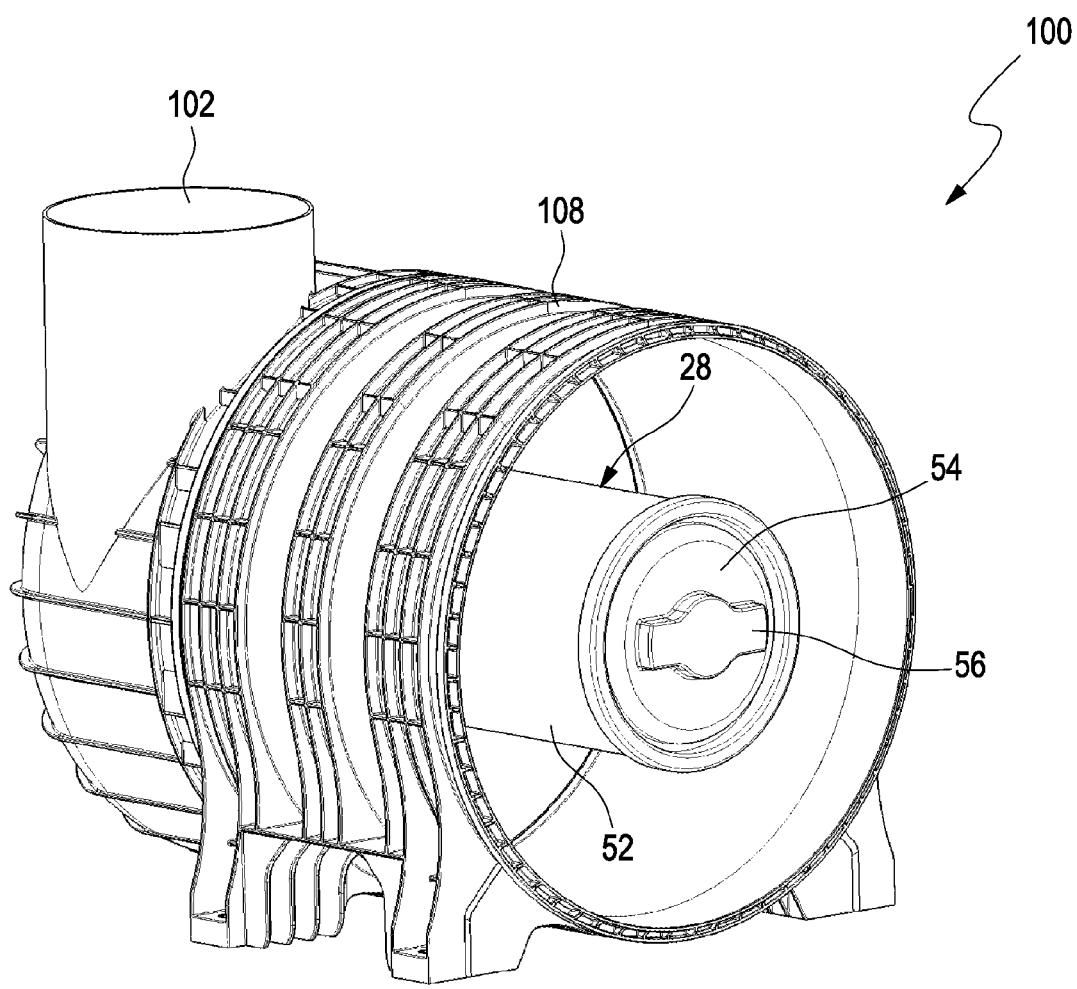
FIG. 5 is a perspective view of the filter system according to FIG. 1 with removed cover and with the follower contour of a secondary element.

FIG. 5 shows a perspective view of a filter system 100 according to FIG. 1 with removed cover and visible follower contour of the secondary element. Here, the secondary element 28 can be seen that is screwed into the housing 108 of the filter system 100 and comprises body 52, end face 54, and follower contour 56; the follower contour 54 is designed in this case as a projection.

Figure 6:
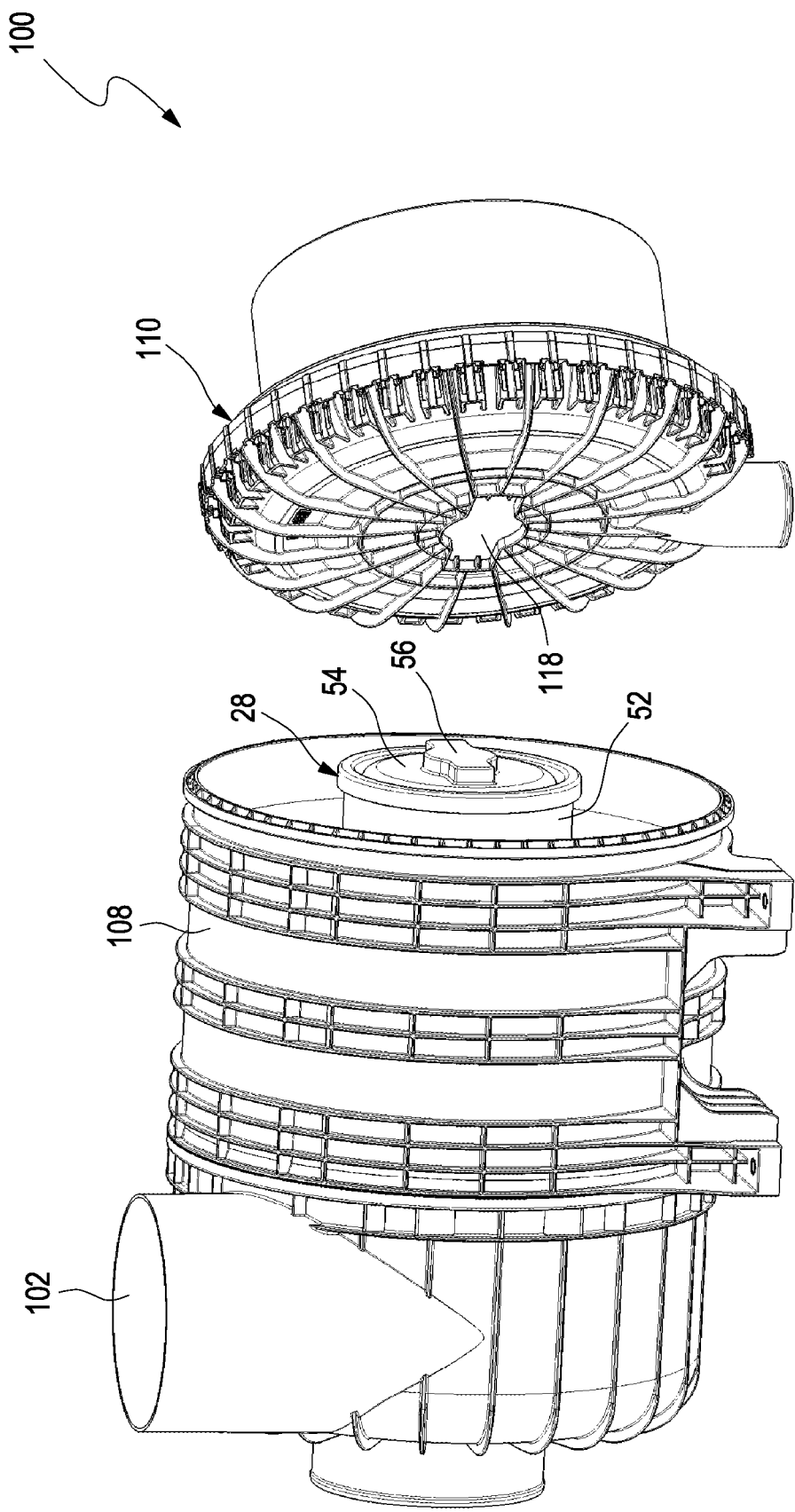
FIG. 6 shows a perspective view of the filter system according to FIG. 1 with removed and turned-over cover before the follower tool of the cover and the follower contour of the secondary element are brought into engagement.

In FIG. 6, a perspective view of a filter system 100 according to FIG. 1 with removed and turned-over cover 110 is illustrated before the follower contours of the cover and the secondary element are being contacted and engaged. This illustrates the utilization of the cover 110 as a follower tool by means of the follower contour 118, designed as a recess in this embodiment and matched with its negative shape to the follower contour 56 of the secondary element 28 at the end face 54 of the body 52.

Figure 7:
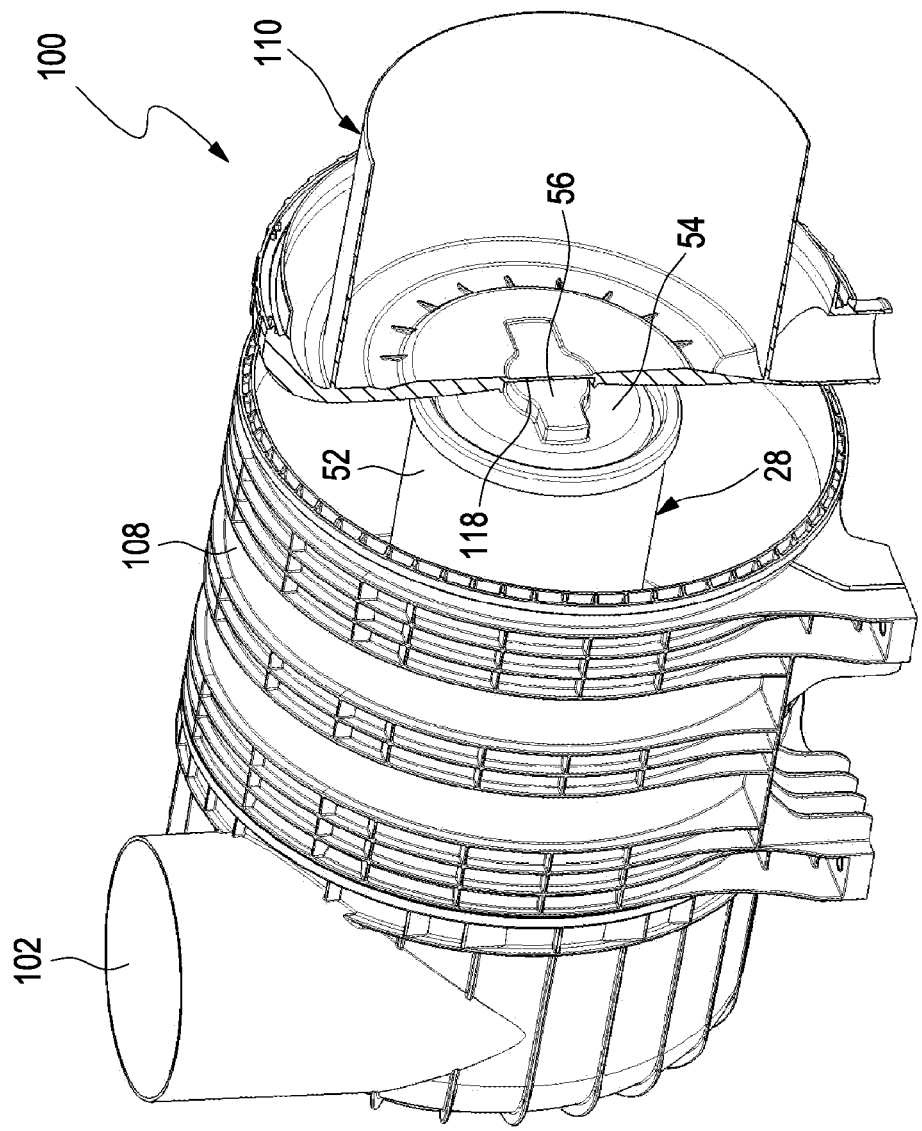
FIG. 7 is a perspective view of the filter system of FIG. 1 with the cover as a tool engaging the secondary element.

FIG. 7 shows furthermore the use of the cover 110 as a follower tool in a perspective view of the filter system 100 according to FIG. 1 with the cover 110 attached as a tool to the secondary element. The cover 110 is positioned with its follower contour 118 directly on the follower contour 56 of the secondary element 28 at the end face 54 of the body 52. For releasing the screw connection of the secondary element 28 from the housing 108, the cover 110 can be rotated so that the cover 110 entrains the secondary element 28 upon rotation. In this way, it is possible by means of the lever action of the cover 110 to apply a greater torque onto the screw connection and to thereby release the connection more easily.

Advantageously, an inlet and/or dirt outlet provided at the cover 110 can be designed as a grip lever so that by means of it upon rotation of the cover 110 an even greater torque can be applied onto the screw connection of the secondary element 28. Such a dirt outlet 106 is, for example, illustrated in FIGS. 1 and 3. In this way, an even easier release of the connection between secondary element 28 and housing 108 is possible.

While specific embodiments of the invention have been shown and described in detail to illustrate the inventive principles, it will be understood that the invention may be embodied otherwise without departing from such principles.

What is claimed is:

1. A filter system comprising:
a housing;
at least one detachable cover detachably connected to the housing to close off the housing;
at least one exchangeable element having an axial end face, the at least one exchangeable element arranged within the housing;
a follower tool including:
a first follower contour formed on an exterior surface of the cover at the exterior of the housing;
a second follower contour formed on an exterior side of the axial end face of the at least one exchangeable element;

wherein the first follower contour is a negative matching shape to the second follower contour, the contours rotationally locking when engaged;

wherein one of the follower contours is a projection that is received into a recess formed in the engaged one of the follower contours;

wherein, when the cover is removed from the housing and turned over, placing and engaging the exterior surface of the cover with the first follower contour against the second follower contour on the exterior side of the axial end face of the at least one exchangeable element, engagement of the first and the second follower contours rotationally lock the at least one exchangeable element to the cover such that the at least one exchangeable element rotates with the cover when the cover is rotated.

2. The filter system according to claim 1, wherein the first follower contour of the follower tool is a recess formed on the exterior surface of cover.

3. The filter system according to claim 1, wherein the first follower contour of the follower tool is a projection formed on the exterior surface of the cover.

4. A filter system comprising:

a housing having a longitudinal axis and a first end face and a second end face;

a cover that closes off the first end face of the housing;

a filter element arranged in an interior of the housing;

an exchangeable secondary element having an axial end face, the exchangeable secondary element arranged in an inner space within the filter element;

an inlet communicating with the interior of the housing for supply of a medium to be filtered and an outlet communicating with the interior of the housing for discharging the medium after filtration;

a follower tool including:
 a first follower contour formed on an exterior surface of the cover at the exterior of the housing;
 a second follower contour formed on an exterior side of the axial end face of the exchangeable secondary element;
 wherein the first follower contour is a negative matching shape to the second follower contour, the contours rotationally locking when engaged;
 wherein one of the follower contours is a projection that is received into a recess formed in the engaged one of the follower contours;
 wherein, when the cover is removed from the housing and turned over, placing and engaging the exterior surface of the cover with the first follower contour against the second follower contour on the exterior side of the axial end face of the exchangeable secondary element, engagement of the first and the second follower contours rotationally lock the exchangeable secondary element to the cover such that the secondary element rotates with the cover when the cover is rotated.

5. The filter system according to claim 4 as a filter for intake air of an internal combustion engine.

6. The filter system according to claim 4, wherein the secondary element is connected by a screw connection with the housing.

7. The filter system according to claim 4, wherein the secondary element is connected by a rotary locking connection with the housing.

8. The filter system according to claim 4, wherein the secondary element is attached to the housing and remains attached to the housing when the filter element is exchanged.

9. The filter system according to claim 4, further comprising
a cyclone separator arranged in the housing at the inlet and further comprising a dirt outlet disposed on the housing or on the cover.

10. The filter system according to claim 9, wherein the dirt outlet is disposed on the cover and is configured as a grip lever, the grip lever operative to rotate the cover and secondary element when the follower tool is engaged.

11. The filter system according to claim 4, wherein the inlet is disposed on the cover and is configured as a grip lever, the grip lever operative to rotate the cover and secondary element when the follower tool is engaged.

12. The filter system according to claim 4, wherein the secondary element is exchangeably arranged in the housing.

13. A secondary element for installation in a filter system according to claim 4, wherein the secondary element is configured to be exchangeably arranged in the housing of the filter system.

* * * * *